Sept. 29, 1959 D. W. COLLIER 2,906,586

SHEET RECORD MACHINE

Filed Jan. 7, 1955

INVENTOR

Donald W. Collier

BY

George H. Fritzinger

United States Patent Office 2,906,586
Patented Sept. 29, 1959

2,906,586

SHEET RECORD MACHINE

Donald W. Collier, Pines Lake, N.J., assignor, by mesne assignments, to McGraw-Edison Company, Elgin, Ill., a corporation of Delaware Application January 7, 1955, Serial No. 480,484

7 Claims. (Cl. 346—138)

Figures 1, 5:
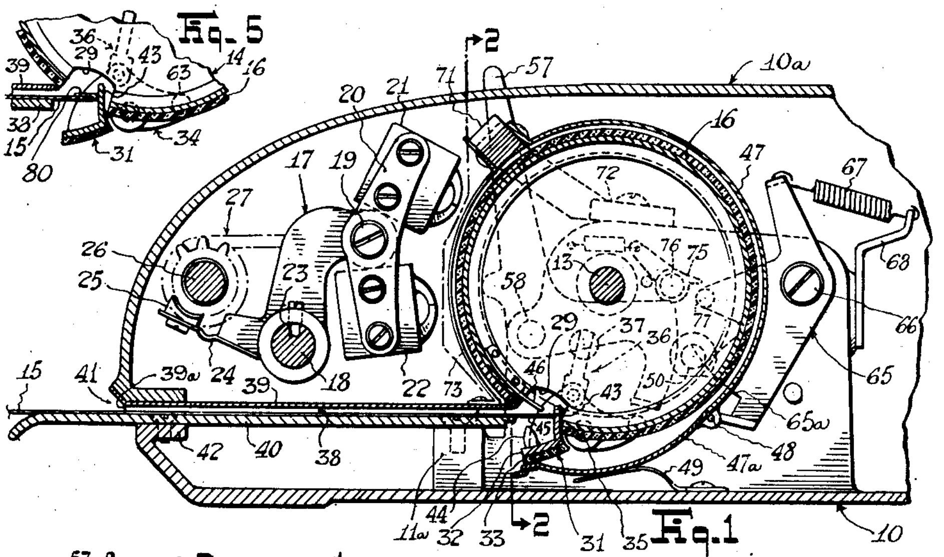

This invention relates to dictating machines which use a record medium in the form of a flexible sheet comprising magnetizable material, and more particularly the invention relates to novel apparatus for mounting such a sheet record in wrap-around relation to a record support with the leading edge of the sheet record concealed in a narrow slit in the supporting surface.

In the present type of sheet record machine the leading portion of the sheet record is attached to the record support to provide for drive of the sheet record in wrap-around relation to the support. As the support is revolved in an advancing direction, a record-engaging magnetic head is moved slowly crosswise to the support so as to scan a helical track on the sheet record with repeated crossing of the joint between the leading and trailing edges thereof. When the sheet record is removed from the support and laid out flat the scanning track appears as a series of side-by-side parallel lines. Removal of a sheet record is accomplished by a stripper plate engageable with the under side of the sheet record as the record support is reversed.

It is of course necessary that the sheet record form a substantially complete loop around the record support. This may be accomplished by having the leading and trailing edges in either an overlapped or butt joint relationship. However, when a butt joint is provided between the edges there may be a problem of avoiding fouling of the leading edge on the scaning heads. This may be prevented by concealing the leading edge in a narrow peripheral slit in the record support. An object of my invention is to provide a new and improved apparatus for mounting a sheet record in wrap-around relation to a record support with the leading edge so concealed in a narrow slit in the support.

Another object of my invention is to provide such sheet-record mounting arrangement which is adapted for attaching the sheet record to the support while the support is at standstill. For these purposes the support has a transverse peripheral section which is openable to receive the leading edge of the sheet record in a relatively wide slot in the support, and which is closable to attach the leading edge to the support and to complete the periphery of the support except for the narrow slit through which the sheet record leads out onto the periphery of the support.

Another object is to provide internal fastening means in such slot adapted for interengagement with complementary elements provided on the leading portion of the sheet record when the openable peripheral section is closed.

Another object is to attach the leading edge loosely to the support within the aforestated slot to enable the sheet record to shift laterally and angularly in response to a sheet record locating means provided on the record support.

Another object is to lock automatically the record support upon completion of removal of a sheet record therefrom.

Another object of my invention resides in providing a simple and effective control mechanism for automatically locking the record support and for automatically opening the peripheral section of the record support as an incident to removing a record from the support.

Another object is to provide for manual closing of the peripheral section and for concurrent unlocking of the record support.

These and other objects and features of my invention will be apparent from the following description and the appended claims.

Figure 2:
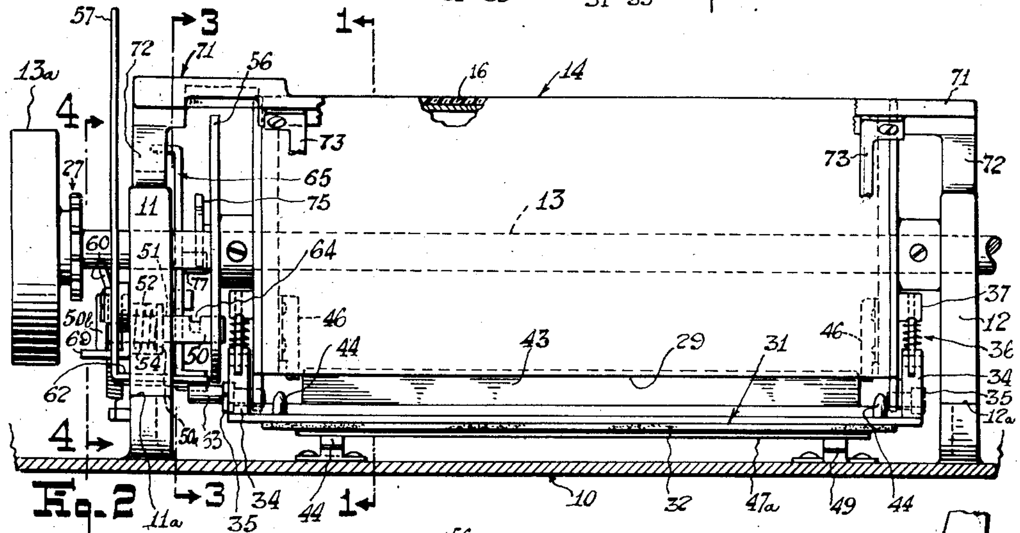
Figure 3:
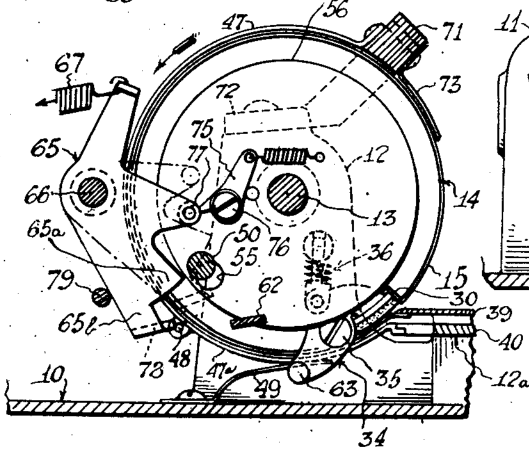
Figure 4:
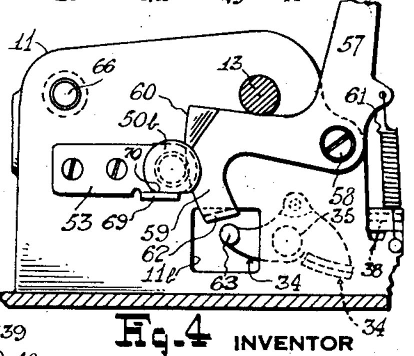

In the description of my invention reference is had to the accompanying drawings, of which:

Figure 1 is a righthand side elevation with parts in section on the line 1—1 of Figure 2, showing a portion of a dictating machine having a record support for a sheet record with means for confining the leading edge of the sheet record in a narrow transverse slit in the supporting surface, the confining means being herein shown in open position ready for attachment of a sheet record to the support;

Figure 2 is a front fractional view taken substantially on the line 2—2 of Figure 1;

Figures 3 and 4 are fractional sections taken respectively on the lines 3—3 and 4—4 of Figure 2; and Figure 5 is a fractional sectional view illustrating an alternative means for attaching the sheet record to the record support.

The sheet record machine shown in the figures has a base 10 and a cooperable upper cabinet structure generally indicated as *10a* to form a complete housing for the operating mechanism. The base 10 is provided with left and right upright standards 11 and 12. These standards have bearings for a shaft 13 on which is mounted a record support 14 in the form of a drum having a substantially endless peripheral surface for carrying a magnetic sheet record 15. This drum has a yieldable peripheral covering 16 to provide a yieldable backing for the sheet record mounted thereon. The drum is driven in an advancing direction, which is a counterclockwise direction as it appears in Figure 1. The drive may be of any suitable form shown only fractionally as including a friction drive wheel *13a* mounted on the left end of the shaft 13.

At the front of the drum there is a carriage 17 mounted slidably on a cross rod 18 for lateral movement along the drum. Pivoted at 19 to this carriage is a rocker beam 20 on one end of which is mounted an erase head 21 and on the other end of which is mounted a record-reproduce head 22. The carriage may be shifted forwardly and rearwardly to place the heads into and out of engagement with the drum, and for this purpose it is splined at 23 to the support rod 18 so that it may be shifted by turning the rod. Mounted on the carriage is a cantilever spring 24 carrying a feed nut 25 for engaging a feed screw 26 concurrently as the heads are placed into engagement with a mounted record. This feed screw has a constant drive coupling with the shaft 13 as by means of a chain drive fractionally indicated at 27. The feed screw 26 and support rod 18 are mounted in suitable standards at their end portions, which need not however be herein shown.

The sheet record is mounted in wrap-around relation to the drum 14 with attachment only of its leading edge thereto as will appear. As the drum is driven in an advancing direction the sheet record thereon is engaged by the heads 21 and 22 in response to any suitable biasing of the carriage 17 (not shown). Furthermore, under influence of such biasing, the feed nut 25 is engaged with the feed screw 26. Accordingly, the carriage is driven progressively along the drum as the drum is rotated, with resultant scanning of the sheet record by the heads in a helical path crossing repeatedly the joint between the trailing and leading edges thereof. During recording, the erase head erases any prior recording on the track in advance of the record head. During reproducing, the erase head is disabled and the record head 22 is operated as a reproducing head. The circuits for so disabling the erase head and for selectively conditioning the machine for recording and reproducing need not however be described for the purposes of the present invention.

During the mounting and removing of a sheet record onto and from the drum, the heads may be disengaged by turning the rod 18 to shift the carriage away from the drum into the position shown in Figure 1. As the carriage is so shifted, the feed nut is also disengaged from the feed screw to enable the carriage to be moved freely along the drum by hand.

In accordance with my invention, the drum is provided with a relatively wide transverse slot 29 to receive the leading edge of the sheet record. This slot is normally closed, except for a narrow lead-out slit 30 at the trailing edge thereof (Figure 3), by means of an openable peripheral section 31 of the drum. This openable peripheral section comprises a metal strip 32 arcuate in cross section and covered by a rubber strip 33 so as to conform evenly with the periphery of the drum when the section is closed. Welded to end portions of the metal strip 32, which extend beyond the ends of the drum, are rocker members 34 which extend generally from the strip 32 in the direction of advance of the drum along the sides thereof. These rocker members are pivoted at their central portions on stud screws 35 which thread into the end walls of the drum. By means of this pivotal mounting, the peripheral section 31 may be moved between open position shown in Figure 1 and closed position shown in Figure 3. Spring-urged over-center mechanisms 36 of standard type are interconnected between central portions of the rocker members and pivoted studs 37 on the end walls of the drum to hold the peripheral section releasably into whichever of its open or closed positions it is moved.

A sheet record is presented into a loading position for attachment to the drum by way of a loading and unloading slot 38 provided in the lower forward portion of the machine. This slot is formed by spaced upper and lower plates 39 and 40 of which the upper plate has turned-down side edges 39$a$ secured as by welding to the lower plate to close the slot at the sides. These plates extend into an opening in the forward wall of the housing and terminate in a flared mouth 41 to facilitate the insertion of a sheet record into the slot.

The lower plate 40 is mounted at its forward end portion on a flange 42 of the housing and is mounted at its rearward end on stepped portions 11$a$ and 12$a$ of the standards 11 and 12, the plate having suitable side extensions to engage these standards.

The sheet loading and unloading position of the drum is one wherein the slot 29 in the drum is at the end of the loading and unloading slot 38, as shown in Figure 1. As the sheet record is pushed into the slot 38 the leading edge thereof passes over the peripheral section 31 into the slot 29 until it abuts against a stop lug 43 on the peripheral section. Upon then closing the peripheral section 31, a pair of inwardly-projecting drive pins 44 on the peripheral section move upwardly to engage loosely a pair of complementary drive holes 45 in the leading portion of the sheet record, the sheet record being backed by a pair of cantilever springs 46 in the vicinity of the drive holes as the peripheral section is closed. Upon next advancing the drum, the sheet record is drawn from the slot 38 in wrap-around relation to the drum with or without overlap of the edges as may be desired. By providing drive pins which loosely engage the sheet record and by making the lead-out slit 30 wider than the thickness of the sheet record, the sheet record becomes attached to the drum with facility to shift laterally and angularly in response to any suitable locating means on the drum such as side rim flanges thereon, which need not however be herein shown and described.

A guide plate 47 extends from the loading slot 38 through a major distance around the drum at a small spacing therefrom in order to confine, throughout its length, the sheet record in close proximity with the periphery of he drum. However, in order to accommodate opening of the peripheral section 31 while the drum is in loading position, a section 47$a$ of the guide plate nearest the loading slot is hinged at 48 for movement downwardly with the opening of the peripheral section 31 as illustrated in Figure 1. When the peripheral section is next closed, this guide plate section is returned by two cantilever springs 49 into abutment with the lower plate 40, in which position it is in spaced conforming relation to the drum, the same as the rest of the guide plate 47. The upper terminal edge of the guide plate 47 is secured to a cross bar 71 having depending feet 72 at its ends resting on and secured to the standards 11 and 12. From this bar to the loading structure at the front of the drum, free access is provided to the drum for the heads 21 and 22. However, at each end of the drum beyond the path of travel of the heads there may be provided an arcuate band 73 which joins the bar 71 with the loading structure to complete a guide structure around the drum. These bands will serve to confine the sheet record sufficiently close to the drum so that it will not be fouled on the heads as the drum is reversely rotated while the heads are in their displaced positions shown in Figure 1.

The drum is locked positively in loading position during the attachment and detachment of a sheet record. This locking means comprises a plunger 50 mounted on the standard 11 in transverse relation thereto. The standard has a narrow bearing 51 for the plunger at its right side, and has a well 52 leading from this bearing throughout the remaining thickness of the standard. On the left side of the standard there is secured a bracket plate 53 which is apertured to receive the plunger and provide it with a second bearing. A compression spring 54 is placed within the well between the bracket plate and an intermediate flange 50$a$ on the plunger, with the flange serving as a stop for the plunger by its abutment against the bearing 51. This limit position on the plunger is its operative one wherein it engages an aperture 55 in a disk 56 mounted on and secured to the hub of the drum at the left end thereof.

The locking plunger 50 may be withdrawn from engagement with the aperture 55 in the disk 56, and the closure section 31 may be concurrently closed, by means of a manual lever 57 pivoted to a stud 58 on the left side of the standard 11. This lever has an arcuate portion 59 interposed between the standard 11 and a head 50$b$ of the plunger, which portion is curved away from the standard at 60 to form a cam for withdrawing the plunger as the lever 57 is pushed rearwardly against force of a tension spring 61 connected between it and the standard 11 (Figure 4). Prior to effecting a complete disengagement of the locking plunger from the disk 56 by the lever 57, a transverse finger 62 on this lever, which extends rightwardly through a clearance opening 11$b$ in the standard 11, impinges against a pin 63 on the left rocker member 34 of the openable peripheral section 31 to move this section over center into closed position.

As the locking plunger 50 is disengaged from the disk 56, a cross slot 64 in the plunger comes into registration with a stepped portion 65$a$ of a latch lever 65 pivoted at 66 to the inner side of the standard 11. This stepped portion of the latch lever bears normally against the plunger under influence of a tension spring 67 between the latch lever and a bracket 68 on the standard 11, but as the slot 64 comes into registration with the portion 65$a$ the latch lever is moved into interlocking engagement with the plunger by the spring 67 to latch the plunger in its withdrawn inoperative position, the end position of the latch lever—which is shown by dash-dot lines in Figure 3—being defined by abutment of an arm 65b thereof against the plunger. In order that the cross slot 64 may not be turned away from the latch lever, the plunger is constrained against turning in its bearings by means of a lug 69 on the bracket plate 53 cooperating slidably with a flat 70 on the head 50b of the plunger.

During reverse movement of the drum to remove a sheet record therefrom, the upper plate 39 of the slot loading structure serves as a stripper to engage the under side of the trailing edge of the sheet record and to direct it through the slot 38 of the front of the machine as illustrated in Figure 3. Reversal of the drum may start from any position while the heads are displaced from the drum since a complete guide structure is provided around the drum to confine the trailing edge in proximity with the drum and to direct it into the slot 38 when it reaches the stripper plate 39.

A feature of my invention is to cause automatically the drum to become locked in loading position and the peripheral section 31 to be opened at the completion of removal of a sheet record therefrom. For this purpose a one-way camming pawl 75 is pivoted at 76 onto the left side of the disk 56, and a cooperating pin 77 is provided on the latch lever 65. At the instant the stripper plate engages the under side of the trailing edge of the mounted sheet record—which occurs during the initial reverse movement of the drum from its loading position—the pawl 75 engages the pin 77 and cams the latch lever clockwise (Figure 3) into an operated position to disengage the step 65a from the locking plunger 50. When this disengagement occurs the plunger is pressed by the spring 54 against the disk 56. However, the latching aperture 55 in the disk 56 is now already slightly displaced from the plunger to prevent the drum from being locked at this time.

As the pawl 75 is moved clear of the pin 77 by the continued reverse movement of the drum, the latch lever is returned only slightly by the spring 67 since it immediately abuts against a solid unslotted portion of the plunger to cause it to be retained effectively in operated position. Bent over rightwardly from the lower arm 65b of the latch lever is a camming lug 78. When the latch lever is in operated position and the closure section 31 is in closed position as shown in Figure 3, this lug lies in the path of the pin 63 on the rocker 34 of the peripheral section. Moreover, this lug 78 is so positioned as to be engaged by the pin 63 while the drum is moved reversely through a final portion of one revolution of travel thereof from its loading position. During this engagement the lever 65 is held positively by a stop pin 79 from being outwardly displaced by the force of the pin 77 thereagainst. Consequently, during the final reverse movement of the drum in stripping a sheet record therefrom, the pin 63 is cammed inwardly by the lug 78 to cause the peripheral section 31 to be cammed open. At completion of the full revolution of reverse movement of the drum from loading position, the aperture 55 comes into registration with the plunger 50 with resultant engagement of the plunger under pressure of spring 54 to lock the drum.

As the peripheral section 31 is opened, the drive pins 44 are disengaged from the drive holes 45 in the sheet record but the sheet record is propelled onwardly with the reverse movement of the drum by abutment of the leading edge thereof against the stop lug 43. Thus, once the drum is stopped in loading position, the sheet record is free to be withdrawn from the slot 38. To reload the machine, a sheet record is again inserted into the slot 38 until it is stopped by abutment against the stop lug 43, and the handle 57 is then pressed rearwardly to close the peripheral section 31 and to unlock the drum for movement by the drive means.

An alternative means for attaching the sheet record to the drum is illustrated in Figure 5. The only differences in this embodiment over the foregoing are that the drive pins 44 are eliminated as are also the drive holes 45 in the sheet record, and the sheet record is instead provided with a reenforced, curled or otherwise thickened leading edge 80 so that it has a thickness greater than the width of the peripheral slit 30 in the drum. Accordingly, when the closure section 31 is closed, the leading edge 80 will catch on the internal edges of this slit to effect a drive connection of the sheet record with the drum without the use of any special attaching means within the slot 29 of the drum.

The embodiments of my invention herein particularly shown and described are intended to be illustrative and not limitative of my invention since the same are subject to many changes and modifications without departure from the scope of my invention, which I endeavor to set forth in the following claims.

I claim:

1. In a machine for operation on a sheet record supported in the form of a closed loop: the combination of a revolvable record support having a substantially endless peripheral surface for supporting said sheet record in wrap-around relation thereto, said record support having an outwardly openable transverse peripheral section for exposing a transverse slot in the record support adapted to receive the leading edge of the sheet record; a loading structure effective when said support is in a predetermined loading position for directing the leading edge of a sheet record into said slot; means operable to close said transverse section while said support is at standstill in said loading position; and means operated by said support as the same is reversely moved into said loading position for opening said transverse section.

2. The combination set forth in claim 1 including means for engaging the under side of the trailing edge of the sheet record to strip it from the support as the support is reversely moved, including means controlling said opening means to cause opening of said transverse section upon completion of substantially one revolution of reverse movement of said support from a position whereat the trailing edge of the sheet record is engageable with said stripping means.

3. In a machine for operation on a sheet record supported in the form of a closed loop: the combination of a revolvable record support having a substantially endless peripheral surface for supporting said sheet record in wrap-around relation thereto, said support having operable means for attaching the leading edge of a sheet record thereto while the support is at standstill in a predetermined position; means for positively locking said support in said predetermined position against movement in either direction; means operable to unlock said support; stripping means for engaging the under side of the sheet record to strip it from said support as the support is reversed one revolution from said predetermined position; and means responsive only on substantial completion of one revolution of reverse movement of said support from said predetermined position for rendering said locking means operative.

4. In a machine for operation on a sheet record supported in the form of a closed loop: the combination of a revolvable record support having a substantially endless peripheral surface for supporting said sheet record in wrap-around relation thereto, said record support having an outwardly openable transverse peripheral section for exposing a transverse slot in the record support adapted to receive the leading edge of the sheet record; a stationary loading structure effective when said support is in a predetermined loading position for directing the leading edge of a sheet record into said slot; a guide means extending from said loading device along said support in close proximity thereto; and means movably mounting a section of said guide means opposite said transverse peripheral section of said record support when the support is in said predetermined position for movement away from the support to clear a space for an opening of the transverse section.

5. In a machine for operation on a sheet record supported in the form of a closed loop: the combination of a revolvable record support having a substantially endless peripheral surface for supporting said sheet record in wrap-around relation thereto, said record support having an outwardly openable transverse peripheral section for exposing a transverse slot in the record support adapted to receive the leading edge of the sheet record; a loading structure effective when said support is in a predetermined loading position for directing the leading edge of a sheet record into said slot; a guide member extending from said loading device along said support in close proximity thereto; means mounting said guide member for movement away from said support to clear a space for an opening of said transverse section; means biasing said guide member closed; and means to cause said guide member to be moved outwardly by said transverse section as the section is opened and to be closed by said biasing means as the transverse section is closed.

6. In a machine for operation on a sheet record supported in the form of a closed loop: the combination of a revolvable record support having a substantially endless peripheral surface for supporting said sheet record in wraparound relation thereto, said record support having an outwardly openable transverse peripheral section for exposing a transverse slot in the support adapted to receive the leading edge of the sheet record; a loading device for guiding the leading edge of the sheet record into said slot when the support is in a predetermined loading position; cooperable means on the leading edge of said sheet record and said support for causing attachment of the sheet record to the support when said peripheral section is closed; a lock normally withheld in inoperative position and effective when released to lock said support when the same reaches said loading position; a stripper plate for engaging the under side of the trailing edge of the sheet record to strip the record from said support as the latter is reversely moved from loading position; means on said support for releasing said lock by initial reverse movement of said support from said loading position; means on said lock to withhold said release means in operated position while said lock is in released condition; and a cam element on said release means effective while the release means is in said withheld position for opening said transverse peripheral section upon continued reverse movement of said support through a final portion of one revolution of reverse movement from said loading position.

7. In a machine for operation on a sheet record supported in the form of a closed loop: the combination of a revolvable record support having a substantially endless peripheral surface for supporting said sheet record in wrap-around relation thereto, said support having operable means at a predetermined point on the periphery thereof for attaching the leading edge of the sheet record thereto at that point and for detaching the leading edge therefrom; guide means for directing a sheet record to and from said support; means for shifting said attaching means into operative position when the record support is in a loading position whereat said attaching means is positioned to receive the leading edge of a sheet record from said guide means; means rendered operative in response to substantially one revolution of reverse movement of said support terminating with said attaching means at said loading position for releasing said attaching means and locking said support; and means for causing said support to be unlocked concurrently as said shifting means is operated to return said attaching means to operative position.

References Cited in the file of this patent

UNITED STATES PATENTS

| | | |
|---|---|---|
| 912,724 | Pancoast | Feb. 16, 1909 |
| 1,264,522 | Jay | Apr. 30, 1918 |
| 2,085,093 | Gauthier | June 29, 1937 |
| 2,165,233 | Curtis | July 11, 1939 |
| 2,231,109 | Breuer et al. | Feb. 11, 1941 |
| 2,372,774 | Finch | Apr. 3, 1945 |
| 2,380,744 | Ford | July 31, 1945 |
| 2,622,000 | Thompson | Dec. 16, 1952 |
| 2,666,808 | Cooley | Jan. 19, 1954 |
| 2,672,346 | Roberts | Mar. 16, 1954 |
| 2,701,177 | Van Rennes | Feb. 1, 1955 |
| 2,714,010 | Gruber et al. | July 26, 1955 |
| 2,717,549 | Keil | Sept. 13, 1955 |
| 2,729,453 | Camras | Jan. 3, 1956 |
| 2,765,210 | Thorp | Oct. 2, 1956 |